Inventors
Gerald M. Rassweiler &
Edward F. Weller, Jr.
By Willits, Helmig & Baillio
Attorneys

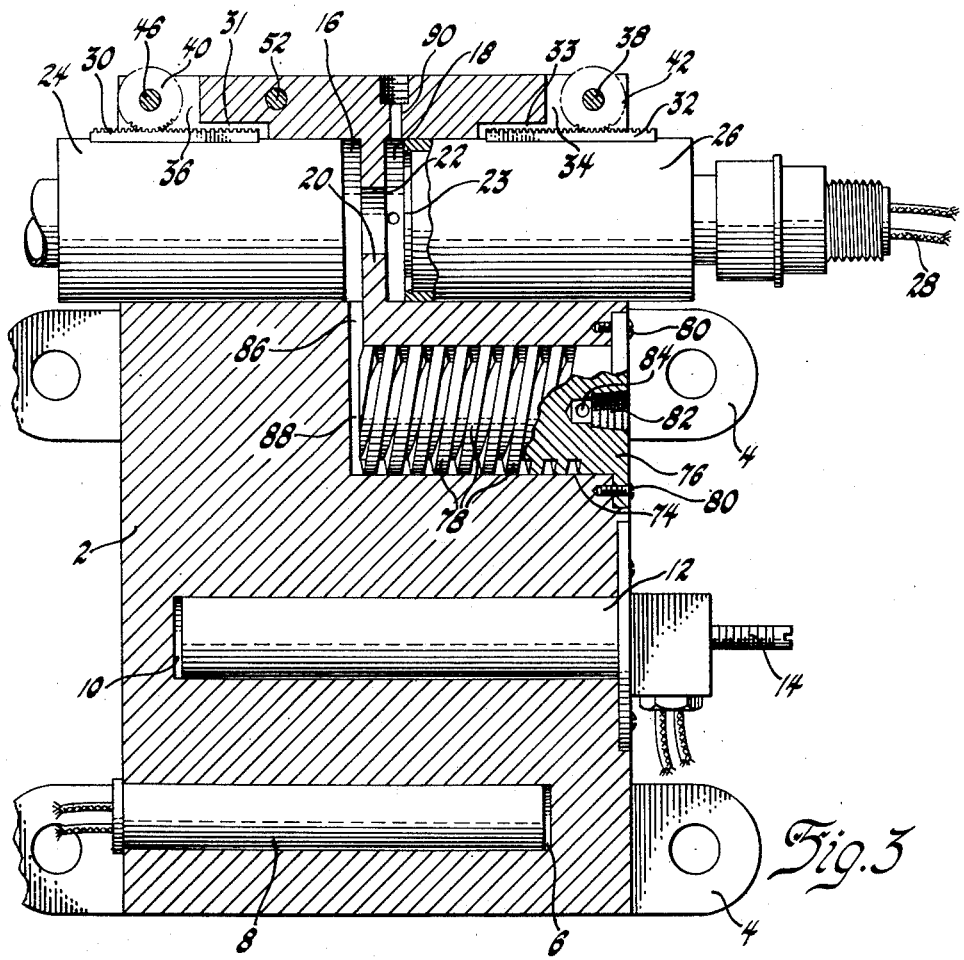
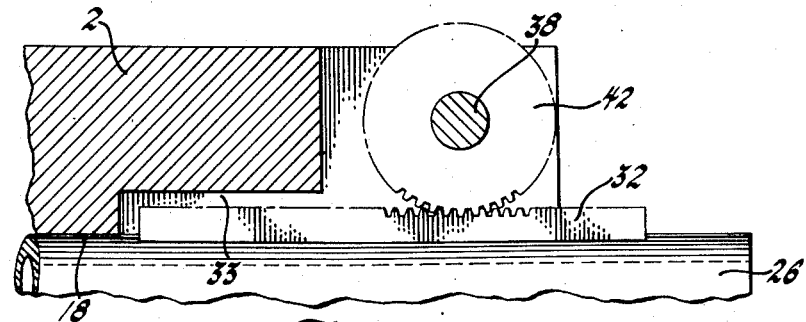
Inventors
Gerald M. Rassweiler &
Edward F. Weller, Jr.
By
Willits, Helwig & Baillio
Attorneys United States Patent Office 2,775,885
Patented Jan. 1, 1957

2,775,885
GAS ANALYZER RESONATOR BLOCK

Gerald M. Rassweiler, Ferndale, and Edward F. Weller, Jr., Detroit, Mich., assignors to General Motors Corporation, Detroit, Mich., a corporation of Delaware Application August 8, 1952, Serial No. 303,384
6 Claims. (Cl. 73—24)

This invention relates to means for analyzing the constituents of gaseous mixtures and more particularly to test cells or blocks to which said mixtures are fed and within which a sample is confined when analyzed.

The speed of sound through different matter varies and is known. Thus the speed of sound through pure gases is known. Utilizing this principle, if the speed of sound through each gas of a binary mixture is known, then the percentage of each gas in the mixture can be determined by ascertaining the speed of sound through the mixture as it will lie at a definite proportionate difference between the speed of sound through either of the gases alone. A system utilizing this principle is disclosed in copending application Serial No. 292,212, filed June 6, 1952, in the name of Edward F. Weller, Jr., et al, now abandoned. The system described in that application operates through resonance in a closed chamber of a sample of the mixture to be analyzed, which resonance controls an oscillator. The resonant frequency is, of course, determined by the speed of sound through the mixture.

The present invention relates to the test cell or block which confines the sample of mixture under test and is an improvement over that type of test cell disclosed in copending application Serial No. 303,922, filed August 12, 1952, in the name of Edward F. Weller, Jr., now abandoned. In that application one form of test cell is disclosed in which the test chamber is a relatively long cylindrical one having electro-mechanical transducers at opposite ends which are relatively movable to change the distance therebetween. In this type of analyzer the mixture flows continuously through the test chamber and is continuously analyzed by the sound method, the results being applied to indicating or recording means. Thus in order to have the indicating or recording means respond as quickly as possible to a change in proportionality of the mixture, the smaller in volume the sample, the quicker will be the change in the test chamber and the quicker the chamber will be purged of the previous proportionalities.

It is therefore an object in making this invention to provide a small test chamber for the analyzing of a gaseous mixture by the resonant sample method.

It is a further object in making this invention to provide a test chamber for the analyzing of gaseous mixtures which is quick purging and quickly responsive to changes in the proportions of the mixture.

It is a still further object in making this invention to provide a test chamber for the analyzing of gaseous mixtures by the resonant principle in which only a small movement is required for tuning and the tuning obtained in very sharp.

It is a still further object in making this invention to provide a test chamber for the sample in which there is only slight damping of response.

With these and other objects in view which will become apparent as the specification proceeds, our invention will be best understood by reference to the following specification and claims and the illustrations in the accompanying drawings, in which:

Figure 3 is a vertical sectional view through the test cell taken on line 3—3 of Figure 2; and Figure 4 is an enlarged partial section of the drive for one of the electro-mechanical transducer units.

Figure 1:
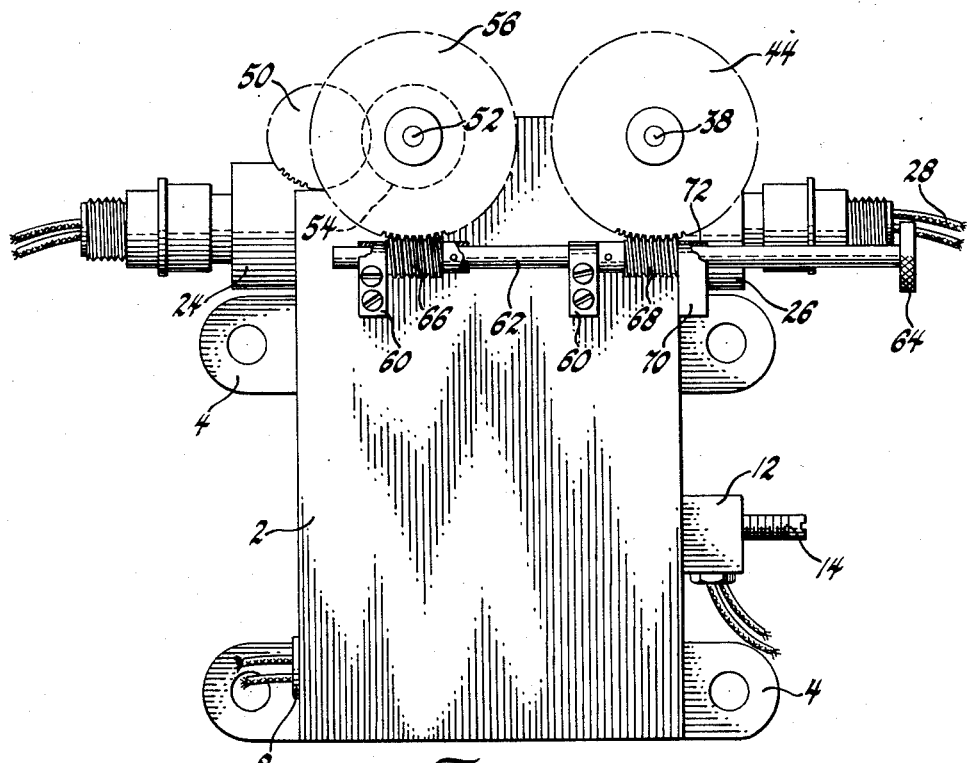
Figure 1 is a side elevation of a test cell for analyzing gaseous mixtures that embodies the invention.
Figure 2:
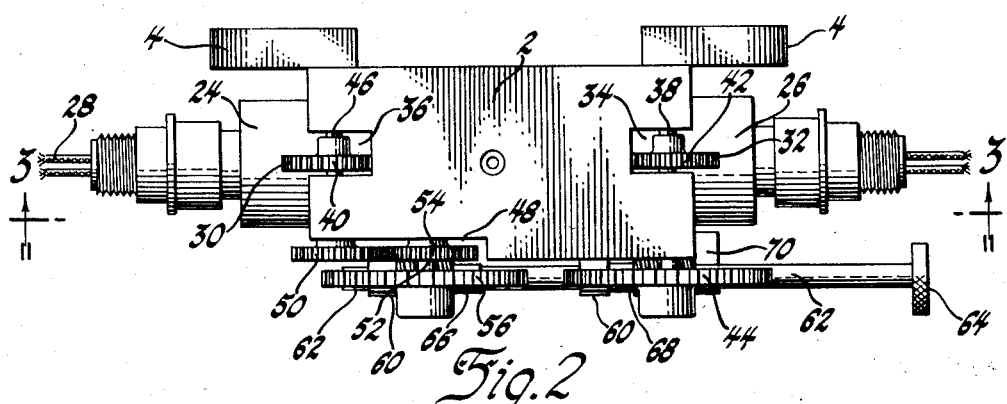
Figure 2 is a top plan view of the test cell.

In this type of analyzer the mixture to be analyzed is fed continuously to a test chamber and then discharged. Any change in the temperature of the gas under observation would cause a change in the speed of sound therethrough so this factor must be maintained constant. The test cell is provided with heating means to maintain the block at a constant temperature and the mixture is led through an elongated passageway in the block so that it is heated to the temperature of the block before being introduced to the chamber. Thus the temperature of the test sample is kept constant.

Referring now more particularly to the drawings, there is illustrated a housing or block 2 formed of good heat conducting material. A plurality of mounting ears 4 are secured to the block 2 for suitably mounting the same. A substantially cylindrical opening 6 is cut into the block 2 from the left-hand side parallel to the base, as viewed in Fig. 3, in which a heating coil assembly 8 is mounted to heat the block to any required temperature. A similar opening 10 is bored into the block 2 from the opposite side and above the opening 6 in which there is located a thermostatic control 12 which is adapted to be connected in circuit with the heating coil to maintain a given temperature in the block. An adjusting screw 14 is provided to change the setting on the thermostat.

Near the top of the block a circular bore 16 is cut in from the left face approximately half the width of the block and a similar bore 18 is cut in from the right face in axial alignment with bore 16, leaving between the two bores a thin section 20 having a central opening 22 therethrough to join the two larger bores. These form together a Helmholtz resonator when closure means are inserted in the bored openings 16 and 18. Cylindrical pistons 24 and 26 of a diameter to fit snugly within the openings 16 and 18 are movably mounted in each opening. These cylindrical pistons carry electro-mechanical transducer means such, for example, as small microphones 23 that are capable of converting sound vibrations into electrical waves and vice versa. Suitable wires such as 28 are provided for connection to the microphones.

On the upper surface of each piston 24 or 26 there is secured a toothed rack 30 and 32 respectively, aligned axially, and sliding in keyways 31 and 33 for the purpose of moving the pistons within the cylindrical bores. In the center of each upper corner of the block 2 there are cut notches 34 and 36. A transverse shaft 38 is rotatably mounted in the upper right-hand corner of the block 2 extending across the notch 34, and projects a short distance from the front face of the block. A small pinion gear 42 is rigidly secured to the shaft within the notch 34 and engages the teeth of the rack 32. A large worm wheel 44 is secured to the projecting end of the shaft 38.

Similarly on the opposite side of the block a transverse rotatable shaft 46 is mounted to extend across notch 36, but the front face of the block is recessed as at 48 and the forward end of the shaft 46 only projects out a short distance beyond this surface. A small pinion 40 is mounted on the shaft 46 in the notch 36 which meshes with rack 30 and a gear 50 is secured to the projecting end of the shaft. A stub shaft 52 is rotatably mounted in the block 2 parallel to shaft 46 and projects forwardly approximately the same distance as the shaft 38. A small gear 54 is keyed to this shaft and meshes with gear 50 and in spaced relation a worm wheel 56 is likewise secured to the shaft 52 which lies in the same plane as worm wheel 44.

A pair of aligned bearing brackets 60 are mounted on the face of the block 2 just below the worm wheels 44 and 56 and rotatably support a shaft 62. A knurled knob 64 is mounted on the extending end of the shaft and a pair of spaced worm gears 66 and 68 are secured to rotate with the shaft and engage worm wheels 56 and 44 respectively. A bracket 70 secured to the end of the block 2 has an opening 72 therein through which the shaft 62 passes to further support the same.

Below the cylindrical bore 18 a smaller cylindrical opening 74 is cut into the block or housing 2. This opening extends approximately half the width of the block. A cylindrical member 76 having a coarse spiral thread 78 on its surface is mounted within this opening by suitable screws 80. The outer diameter of the threads coincides with the inner diameter of the opening 74, providing an elongated spiral channel from one end of the member 76 to the other. The outer end of the member 76 has a small threaded bore 82 which joins a radially extending channel 84, terminating in the base of the first thread. This is the inlet opening for the introduction of gaseous mixture and provides for its flow to the elongated spiral path. A short interconnecting duct 86 connects the cylindrical bore 16 with the inner end of cylindrical opening 74 and through it the gaseous mixture that has proceeded through the spiral path enters the resonant chamber. The member 76 does not extend to the bottom of the opening 74 providing a small chamber 88. A second short duct 90 connects cylindrical opening 18 to the outer atmosphere, the outer end of the duct being threaded for the application of any desired venting means.

As previously mentioned, a Helmholtz type resonator is formed by the inner ends of the chambers 16 and 18 and the interconnecting channel 22. The mixture to be analyzed is introduced to connection 82, and flows radially through duct 84 to one end of the spiral passageway formed by the thread 78. It then follows the tortuous spiral passageway to chamber 88, during which time it is heated to a given temperature since the block is maintained by the heating coil 8 and thermostat 12 at a fixed temperature. From chamber 88 it flows through duct 86 into chamber 16, through duct 22 to chamber 18, and then vents to the air through duct 90. The pressure on the mixture is just sufficient to keep the same moving and therefore there is practically no change. The temperature is regulated by the thermostatic control.

The gaseous mixture in the duct 22 vibrates between the electromechanical transducers 24 and 26 to control the oscillator, the frequency of the oscillations being determined by the constituents of the mixture. It is obvious from the disclosure that only a small sample is analyzed and that this sample is changed quickly by the flow through the duct. Therefore very accurate determinations are possible and any change is quickly noted. This type of resonator can be very sharply tuned. The tuning is, of course, accomplished by tuning the knurled knob 64, which simultaneously moves the transducers in opposite directions to either increase or decrease the size of the chambers. The movements required is relatively small.

We claim:

1. In gas analyzing means, a housing, a plurality of equal volume chambers in said housing interconnected by a short tubular duct, an inlet duct in said housing terminating in one chamber for the introduction of gaseous mixtures for analysis electro-mechanical transducer means mounted in each chamber for adjustment therein and forming a wall thereof, movement of which will vary the size of the chamber and common means for simultaneously moving the transducers to adjust the chamber sizes to maintain the two equal but adjst the volumes.

2. In gas analyzing means, a housing, a pair of equal volume chambers in said housing interconnected by a passageway of small cross section and forming a resonator of the Helmholtz type, an inlet duct in said housing terminating in one chamber for the introduction of gaseous mixtures for analysis, an electro-mechanical transducer means mounted in each chamber of the resonator and forming a wall thereof and common means on said housing to simultaneously move the transducer means to tune the two halves of the resonator maintaining equal volumes.

3. In gas analyzing means, a housing, a plurality of equal volume chambers in said housing interconnected by a tubular duct, electro-mechanical transducer means mounted in each chamber for adjustment therein and forming a wall thereof, movement of which will vary the size of the chamber, common means for simultaneously moving the transducers to adjust the chamber sizes, a cylindrical chamber in said housing interconnected with one of the first-named chambers, a cylindrical member having a spiral thread fitting within the cylindrical chamber and forming therewith a tortuous passage through which a gaseous mixture is confined to flow before entering the first-named chambers.

4. In gas analyzing means, a housing, a plurality of equal volume chambers in said housing interconnected by a tubular duct, electro-mechanical transducer means mounted in each chamber for adjustment therein and forming a wall thereof, movement of which will vary the size of the chamber, common means for simultaneously moving the transducers to adjust the chamber sizes, a cylindrical chamber in said housing interconnected with one of the first-named chambers, a cylindrical member having a spiral thread fitting within the cylindrical chamber and forming therewith a tortuous passage through which a gaseous mixture is confined to flow before entering the first-named chambers, and means for maintaining the temperature of the housing at a predetermined level.

5. In gas analyzing means, a housing, a plurality of cylindrical chambers in said housing interconnected by a short tubular duct, an inlet duct in said housing terminating in one chamber for the introduction of gaseous mixtures for analysis, cylindrical means fitting within each chamber and forming a wall thereof, rack means on each cylindrical means, gearing mounted on the housing and meshing with the rack means, and a common driving means for said gearing to simultaneously drive both cylindrical means in opposite directions to tune the resonator formed by the chambers and the interconnecting duct maintaining the volume of the two chambers equal at all times.

6. In gas analyzing means, a housing, a plurality of cylindrical chambers in said housing interconnected by a short tubular duct, an inlet duct in said housing terminating in one chamber for the introduction of gaseous mixtures for analysis cylindrical means fitting within each chamber, rack means on the cylindrical means, gearing mounted on the housing and meshing with the rack means, a common driving means for said gearing to simultaneously drive both cylindrical means to tune the resonator formed by the chambers and the interconnecting duct maintaining the volumes of the chambers equal, and electro-mechanical transducer means mounted on each of the cylindrical means affected by said resonance.

References Cited in the file of this patent

UNITED STATES PATENTS

| | | |
|---|---|---|
| 660,761 | Seyfarth | Oct. 30, 1900 |
| 1,570,781 | Ruben | Jan. 26, 1926 |
| 1,734,026 | Bijur | Oct. 29, 1929 |
| 2,521,634 | Janssen et al. | Sept. 5, 1950 |
| 2,653,471 | Clewell | Sept. 29, 1953 |

FOREIGN PATENTS

| | | |
|---|---|---|
| 574,819 | Great Britain | Jan. 22, 1946 |